3,257,954
LINE PUMP
Donald C. Millburn, San Diego, Calif., and Don W. Millburn, 3720 Ingram, San Diego, Calif.; said Donald C. Millburn assignor to said Don W. Millburn
Filed Sept. 14, 1964, Ser. No. 396,226
4 Claims. (Cl. 103—87)

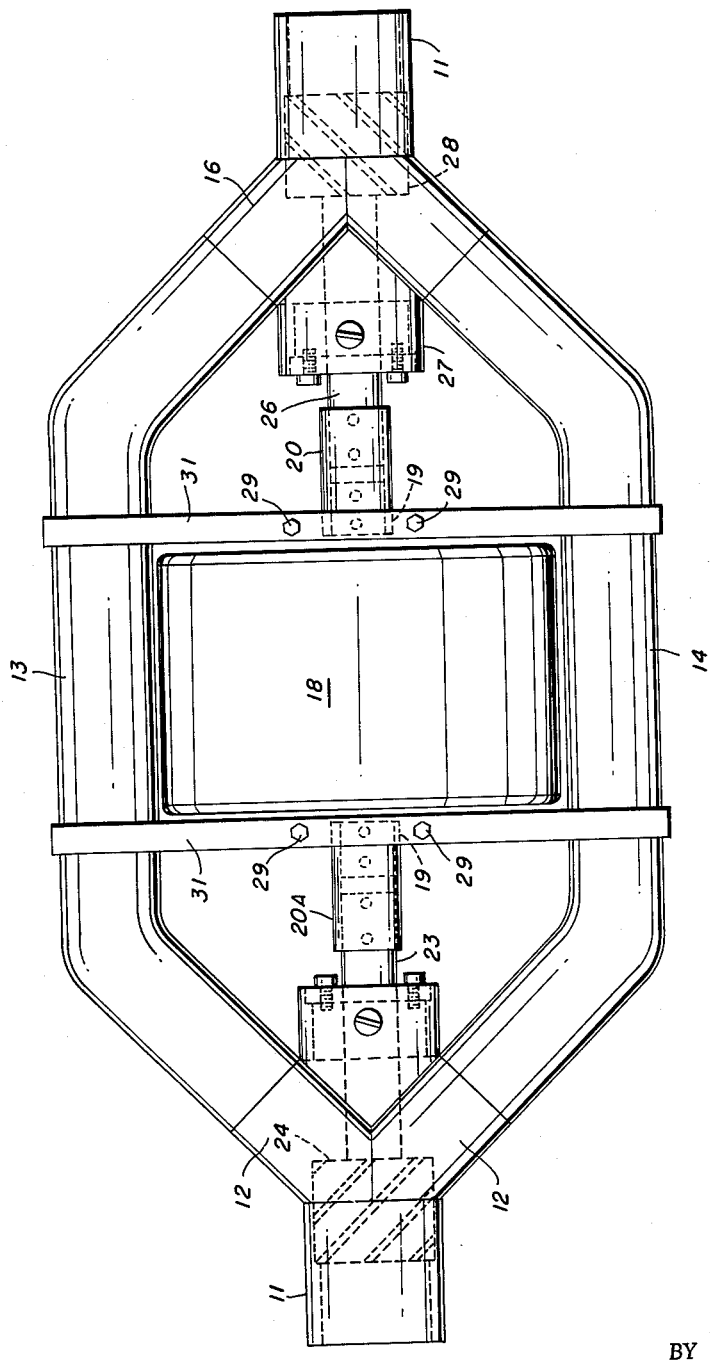

The present invention relates to a line pump and more particularly to a line pump utilizing a 45° line coupling section for coupling an impeller in axial alignment to a flow line of interest, and more specifically to a line pump which can reverse the direction of flow by merely reversing the direction of a power unit coupled thereto.

According to the invention, a power unit is directly coupled to at least one screw type 45° impeller. A flow line of interest is provided with a coupling section coupled to the flow line at a 45° angle. The impeller is placed in the junction in axial alignment with the flow line for pumping fluid from said flow line to the coupling section and in a reverse direction from said coupling section to said flow line. The direction of flow is reversed by merely reversing the direction of rotation of the power unit coupled to the impeller.

It is an object of the present invention to provide a line pump which is reversible by merely reversing the direction of rotation of an associated power unit.

Another object is to provide a line pump in which the power unit can be directly coupled to one or more impellers associated therewith.

A further object of the invention is to provide a pump with a minimum of vibration and fluid turbulence.

Still another object of the invention is to provide a line pump which is extremely efficient, relatively inexpensive and requires a minimum of maintenance.

Other objects and many of the attendant advantages of the invention will be readily appreciated as the same becomes better understood by reference to the following detailed description when considered in connection with the accompanying drawing in which the sole figure illustrates the preferred embodiment of the invention.

Referring to the drawing, flow line 11 is coupled through Y section 12 to parallel lines 13 and 14. Parallel lines 13 and 14 are coupled by Y section 16, which is identical to Y section 12, back to flow line 11. Power unit 18 has a shaft 19 which is coupled to bearing blocks 21 and 22 by sleeves 20. Bearing block 21 is integral with Y section 12. Impeller shaft 23 passes through bearing block 21 and connects to 45° impeller blade section 24. Impeller shaft 26 is coupled to power shaft 19 by coupling sleeve 20 and passes through bearing block 27 which is integral with Y shaped section 16 to 45° impeller blade section 28. Power unit 18 is mounted by bolts 29 to support members 31 which are carried by parallel lines 13 and 14. Impeller shafts 23 and 26 are in axial alignment with flow lines 11 and are at 45° at their junctions with parallel lines 13 and 14.

Operation

In operation, both power shafts 19 are rotating in the same direction from power unit 18 which can be any convenient torque source such as an electric motor. Impellers 24 and 28 are then rotated in opposite directions, one of them being at the exhaust end of the entire pump unit, and the other being at the intake end of the entire pump unit. The outermost cutting edge of one 45° impeller will act as a scoop to pick up the fluid being pumped from the innermost edge of its blades (not shown) and the other impeller will act in an opposite manner. The fluid being pumped will be impelled along the 45° plane of the impeller blades at the inlet end, and will release at 45° into parallel lines 13 and 14.

By the direct connection of each 45° impeller 24 and 28 to the power unit shaft 19, the entire unit becomes a pump consisting in theory and operation of only one moving part. Since the fluid being pumped is brought into the pump in equal quantities around the entire circumference of one impeller, and is exhausted in the same manner at the opposite end, the fluid being pumped acts as a bearing at each end to keep any side play and/or bearing wear to a minimum.

Modifications to the unit illustrated could include more than two parallel lines, e.g. 4 lines, symmetrically disposed about power unit 18, and possibly one impeller could be eliminated with the resultant loss of power and efficiency.

It should be understood, of course, that the foregoing disclosure relates to only a preferred embodiment of the invention and that it is intended to cover all changes and modifications of the example of the invention herein chosen for the purposes of disclosure which do not constitute departure from the spirit and scope of the invention.

What is claimed is:
1. A reversible line pump comprising:
  (a) a reversible power unit;
  (b) at least one impeller coupled to said power unit, said at least one impeller having a screw at an angle of substantially 45°;
  (c) a flow line having a parallel line coupling section, said parallel line coupling section having at least two parallel lines coupled at each end at an angle of substantially 45° to an axis of said flow line; and
  (d) at least one end of said parallel line coupling section having said impeller mounted therein in axial alignment with said flow line and having said screw at an angle of substantially 45° to said flow line.

2. A line pump comprising:
  (a) a power unit;
  (b) at least one impeller coupled to said power unit, said at least one impeller having a screw at an angle of substantially 45°;
  (c) a flow line having a parallel line coupling section, said parallel line coupling section having at least two parallel lines coupled at each end at an angle of substantially 45° to an axis of said flow line; and
  (d) at least one end of said parallel line coupling section having said impeller mounted therein in axial alignment with said flow line and having said screw at an angle of substantially 45° to said flow line.

3. A line pump comprising:
  (a) a power unit;
  (b) at least one impeller coupled to said power unit, said at least one impeller having a screw at an angle of substantially 45°;
  (c) a flow line having a coupling section, said coupling section having at least one coupling line coupled at one end at an angle of substantially 45° to an axis of said flow line; and
  (d) at least one coupling section having said impeller mounted therein in axial alignment with said flow line and having said screw at an angle of substantially 45° to said flow line.

4. A reversible line pump comprising:
  (a) a reversible power unit;
  (b) at least one impeller coupled to said power unit, said at least one impeller having a screw at an angle of substantially 45°;
  (c) a flow line having a coupling section, said coupling section having at least one coupling line coupled at one end at an angle of substantially 45° to an axis of said flow line; and
  (d) at least one coupling section having said impeller mounted therein in axial alignment with said flow line and having said screw at an angle of substantially 45° to said flow line.

References Cited by the Examiner

UNITED STATES PATENTS

| | | | |
|---|---|---|---|
| 139,854 | 6/1873 | Bantz | 103—93 |
| 913,364 | 2/1909 | Crowhurst | 103—89 X |
| 1,497,575 | 6/1924 | Menge | 103—3 X |
| 2,004,571 | 6/1935 | De Bothezat | 230—117 X |

FOREIGN PATENTS 372,280   4/1939   Italy.

ROBERT M. WALKER, *Primary Examiner.*